US 6,731,919 B2

United States Patent
Uchida et al.

(10) Patent No.: US 6,731,919 B2
(45) Date of Patent: May 4, 2004

(54) AMPLIFIER APPARATUS AND METHOD FOR CONTROLLING A LOCAL OSCILLATOR FREQUENCY BASED ON THE DETECTED TEMPERATURE OF IF BANDPASS FILTERS

(75) Inventors: Takashi Uchida, Tokyo (JP); Masaki Suto, Tokyo (JP); Shoji Fujimoto, Tokyo (JP); Junetsu Urata, Tokyo (JP); Hidefumi Ito, Akitaken (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 335 days.

(21) Appl. No.: 09/973,691

(22) Filed: Oct. 11, 2001

(65) Prior Publication Data

US 2002/0022464 A1 Feb. 21, 2002

(51) Int. Cl.$^7$ .............................. H04B 7/00; G08B 13/18
(52) U.S. Cl. ....................... 455/259; 455/208; 455/318; 331/66; 331/176; 331/41
(58) Field of Search ............................... 331/175, 176, 331/177 R, 41, 43, 66, 69, 70; 455/207, 208, 67.11, 67.13, 75, 76, 115.1, 118, 192.1, 192.2, 196.1, 197.1, 230, 255, 256, 257, 258, 259, 260, 264, 307, 308, 311, 313, 314, 315, 316, 318, 323, 334, 339, 341; 330/137

(56) References Cited

U.S. PATENT DOCUMENTS 5,204,972 A  *  4/1993  Hashimoto ................... 455/207
2002/0022464 A1  *  2/2002  Uchida et al. ............... 455/255

FOREIGN PATENT DOCUMENTS

GB          2 234 127    *  1/1991    ............. H03J/3/04
JP          2000-286737  *  10/2000   ............ H04B/1/26

* cited by examiner

Primary Examiner—Charles Appiah
Assistant Examiner—Rafael Perez-Gutierrez
(74) Attorney, Agent, or Firm—Wenderoth, Lind & Ponack, L.L.P.

(57) ABSTRACT

Disclosed is an amplifier apparatus that corrects mismatching of the filter transmission characteristic due to a change in the temperature of the amplifier apparatus itself and thereby stably amplifies the high-frequency signal. The amplifier apparatus converts a signal to be processed into one having an intermediate frequency band to thereby execute amplification processing. It comprises a local oscillator 31 the oscillation frequency of that can be altered, a first frequency converter 13 that converts the signal by the use of the oscillation frequency from the local oscillator into an intermediate frequency, a first band pass filter 14 that band-limits the signal having the intermediate, an amplifier 15 that amplifies the signal of the intermediate frequency that has passed therethrough, a second band pass filter 16 that band-limits the signal of the intermediate frequency that has been output therefrom, a second frequency converter 17 that converts the signal of the intermediate frequency that has passed therethrough into the original frequency by the use of the local-oscillation frequency, a temperature sensor 32 that detects the temperature of each of the first and second filters 14, 16, and a controller 33 that alters the oscillation frequency of the local oscillator 31 in correspondence with the detected temperature and thereby stabilizes the transmission characteristic of each of the first and second filters irrespective of the change in the temperature.

4 Claims, 6 Drawing Sheets

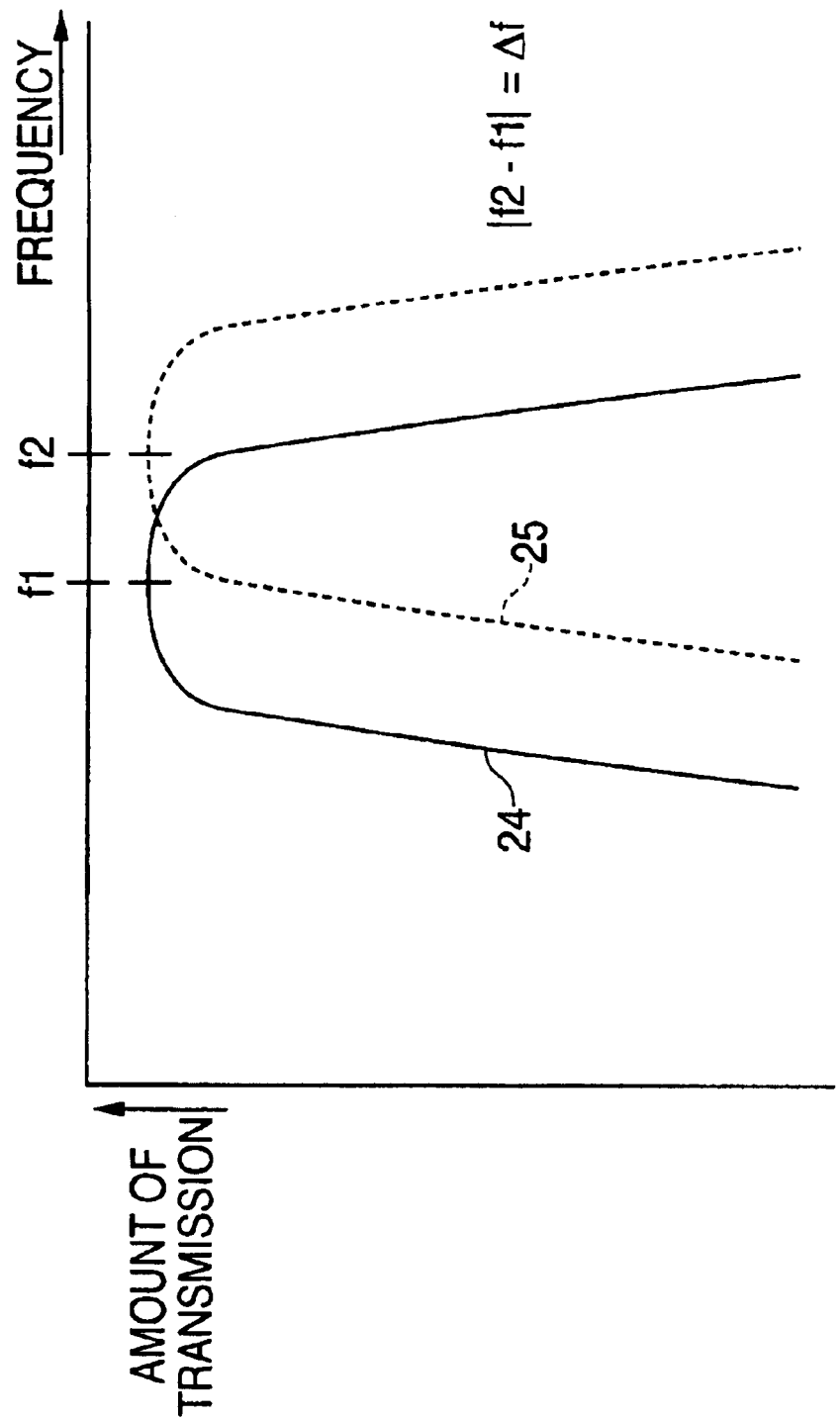

AMPLIFIER APPARATUS AND METHOD FOR CONTROLLING A LOCAL OSCILLATOR FREQUENCY BASED ON THE DETECTED TEMPERATURE OF IF BANDPASS FILTERS

BACKGROUND OF THE INVENTION

1. Field of the Invention

The present invention relates to an amplifier apparatus that is used as a high-frequency amplifier apparatus for use in, for example, a wireless apparatus. More particularly, the invention concerns an amplifier apparatus that even when the ambient temperature changes can maintain the performance of sharply attenuating a frequency band adjoining to a frequency band serving as an object to be amplified.

2. Description of the Related Art

For example, a high-frequency amplifier apparatus that is used in a conventional wireless apparatus is constructed in multiple stages. As a method of limiting the pass frequency band, a band pass filter is connected to an input or output of the high-frequency amplifier apparatus. Or, a bandpass filter is connected to between two adjoining stages of the high-frequency amplifier apparatus. By doing so, there is generally made up a construction of limiting the frequency pass band and thereby attenuating a frequency band the amplification of that is unnecessary.

In FIG. 2, there is illustrated a construction of the above-described conventional high-frequency amplifier apparatus. A reference numeral 1 denotes a band pass filter that causes a signal having a frequency band (a peculiar-to-apparatus band, i.e., an original band), an object to be amplified, to be passed therethrough and that causes the other frequency bands to be attenuated down to a required level. A reference numeral 2 denotes a low-noise amplifier that low-noise-amplifies the original band signal that has passed through the band pass filter 1. A reference numeral 3 denotes a power amplifier that amplifies the low-noise-amplified signal up to a required high-frequency power. A reference numeral 4 denotes a bandpass filter that attenuates an unneeded frequency band.

In the above-described high-frequency amplifier apparatus, it is effective in case its required performance is seen in the circumstances where the attenuation characteristics of frequencies other than the pass band frequency are gentle and the attenuation at an adjoining frequency band is relatively small. In FIG. 3 there is illustrated a filter transmission characteristic. Assume that the characteristic indicated surrounded by each mark A in the figure be the required filter transmission characteristic. Then, a characteristic 5 shows that a transmission characteristic further sharpening the gradient of the filter transmission characteristic is required, while a characteristic 6 shows that the gradient of the transmission characteristic meets the required gradient. However, in the latter case, because the characteristic 6 is made to be the one wherein the pass bandwidth B is narrowed, a transmission characteristic making the pass bandwidth wider is required.

In order to realize the filter transmission characteristic meeting the above-described required transmission characteristic, it becomes necessary to make up the following construction. Namely, wherein the gradient of the transmission characteristic is made sharp by increasing the number of the filter stages; or the transmission loss is made small and the end of the pass band is made acute by enlarging the volume of the filter per se.

However, this construction is inevitably followed by an increase in the volume and weight of the high-frequency amplifier apparatus, as well as by an increase in the cost that occurs due to the increase in the cost for adjustment.

On this account, as a high-frequency amplifier apparatus that can solve the increase in the stages number and volume of the pass band filter, which are the above-described points in problem, to thereby enable miniaturization and economization of it, the following construction has hitherto been proposed. Namely, wherein an original signal is converted by a frequency converter to a frequency falling within an intermediate-frequency band (IF band) the frequency of that is lower than the original frequency. Then, the IF band is connected to a filter of a required transmission characteristic. Then, this IF band is again converted to the original frequency by a frequency converter.

In FIG. 4 there is illustrated the construction of a high-frequency amplifier apparatus in which to convert the signal into the IF band for processing thereof. A reference numeral 11 denotes a band pass filter that permits the passage therethrough of a signal having a frequency band (an original band: fr) to be amplified. A reference numeral 12 denotes a low-noise amplifier that low-noise-amplifies the signal the frequency of that is the original band. A reference numeral 13 denotes a frequency converter that converts the signal having the original band to an IF band (fi). A reference numeral 14 denotes an IF frequency band pass filter that permits the passage therethrough of the signal having the IF frequency band (fi). A reference numeral 15 denotes an IF frequency band amplifier that amplifies the signal having the IF band. A reference numeral 16 denotes an IF frequency band pass filter that permits the passage therethrough of the signal having the IF frequency band (fi). A reference numeral 17 denotes a frequency converter that converts the signal having the IF frequency band (fr) to the original band (fr). A reference numeral 18 denotes a power amplifier that amplifies the converted signal having the original band up to a high-frequency power. And a reference numeral 19 denotes a band pass filter that attenuates an unneeded frequency band.

And, in this high-frequency amplifier apparatus, an oscillation frequency signal from a local oscillator 20 is distributed by a distributor 21 into the converters 13, 17. And, by multiplying the original band by a local oscillation frequency, frequency conversion is performed between the original band and the IF band.

Here, in FIG. 5, there are illustrated a transmission characteristic 22 of a filter the center frequency of that is a frequency fr0 and a transmission characteristic 23 of a filter the center frequency of that is a frequency fi0 lower than the frequency fr0. As illustrated in the figure, assuming that the pass bandwidth $\Delta f$ be the same in the bandwidth in terms of either filter, it is known that the following can be said. Namely, in case the number of stages is the same, the transmission characteristic that is lower in the center frequency becomes sharper in gradient of attenuation. Namely, in FIG. 5, the following is known in terms of the relationship that when the frequency displacements $\Delta f$ from the both center frequencies are the same in value holds true between the amounts $\alpha 1$, $\alpha 2$ of attenuation of the respective filters. Namely, the $\alpha 1$ is greater than the $\alpha 2$.

Accordingly, in the case of constructing a multi-stage amplifier apparatus for limiting the pass band of frequency, when making great the amount of attenuation of an adjoining frequency, there has hitherto been used the amplifier apparatus such as in FIG. 4. Namely, the amplifier apparatus for converting the original frequency to the IF band.

However, in case the amplifier apparatus has been made to have such a construction as illustrated in FIG. 4, the band pass filter 14 or 16 for passing the IF frequency band has a center frequency of its pass band shifted due to a change in the ambient temperature. Resultantly, a shift of the frequency occurs in the transmission characteristic of the filter, with the result that the filter has the inherent drawback incapable of filtering its required band of frequency.

In FIG. 6 there is illustrated a change in the transmission characteristic due to a change in the ambient temperature of the band pass filter. The characteristic 24 indicated by a solid line represents the filter transmission characteristic at normal temperature while the characteristic 25 indicated by a broken line represents the filter transmission characteristic at the time of a change in the temperature.

In case having used the above-described filter whose characteristic varies depending upon the temperature, the characteristic of the high-frequency amplifier apparatus illustrated in FIG. 4 is approximately determined according to the transmission characteristics of the band pass filters 14, 16 each for the IF band. Namely, that characteristic inconveniently becomes dependent upon the ambient temperature very much. Especially, in a frequency range in which the attenuation characteristic is sharp, the transmission characteristic of the amplifier apparatus becomes deteriorated due to the change in the temperature. As a result, there was the problem that it was impossible to realize a stable transmission characteristic of the amplifier apparatus.

SUMMARY OF THE INVENTION

The present invention has been made in view of the above-described conventional circumstances and has an object to provide an amplifier apparatus arranged to select the pass band, which has corrected the shift of the filter transmission characteristic due to a change in the temperature and can stably amplify a high-frequency signal, and can be made small in size and low in cost.

Another object of the present invention is to provide an amplifier apparatus in which correcting the shift of the filter transmission characteristic as above can be arbitrarily adjusted.

To attain the above object, the present invention provides an amplifier apparatus which is adapted to convert a signal to be processed into one having an intermediate frequency band to thereby execute amplification processing and which includes a local oscillator the oscillation frequency of that can be altered, a first frequency converter that converts the signal to be processed by the use of the oscillation frequency from the local oscillator into an intermediate frequency, a first intermediate frequency band/band pass filter that limits to an intermediate frequency band the signal to be processed having the intermediate frequency that has been output from the first frequency converter, an intermediate-frequency amplifier that amplifies the signal to be processed having the intermediate frequency that has passed through the first intermediate frequency band/band pass filter, a second intermediate frequency band/band pass filter that limits to an intermediate frequency band the signal to be processed having the intermediate frequency that has been output from the intermediate-frequency amplifier, a second frequency converter that converts the signal to be processed having the intermediate frequency that has passed through the second intermediate frequency band/band pass filter into the original frequency by the use of the oscillation frequency from the local oscillator, a temperature sensor that detects the temperature of each of the first and second intermediate frequency band/band pass filters, and a controller that alters the oscillation frequency of the local oscillator in correspondence with the detected temperature and thereby stabilizes the transmission characteristic of each of the first and second intermediate frequency band/band pass filters irrespective of the change in the temperature.

Here, it may be arranged that the temperature detector directly detects the temperature of each of the first and second intermediate frequency band/band pass filters. Or it may be arranged that by detecting the temperature of the ambient zone, in which each of the first and second intermediate frequency band/band pass filters has been installed, the temperature of each of these filters is indirectly detected.

Also, the amplifier apparatus according to the present invention has equipped thereto a memory for having stored therein the frequency shift data of the transmission characteristic of each of the first and second intermediate frequency band/band pass filters due to the change in the temperature. And the controller alters the oscillation frequency of the local oscillator according to the frequency shift data read out from the memory and the detected temperature obtained from the detector. Thereby, the amplifier apparatus can even cope with another intermediate frequency band/band pass filter, the temperature characteristic of that is different, by reloading the shift data of the memory or replacing the memory with another memory having stored therein different shift data.

BRIEF DESCRIPTION OF THE DRAWINGS

FIG. 6 is a graph illustrating an example of the transmission characteristics of a band pass filter that occur when the temperature has been changed.

DESCRIPTION OF THE PREFERRED EMBODIMENTS

The present invention will now be concretely explained on the basis of an embodiment of the high-frequency amplifier apparatus.

Figure 4:
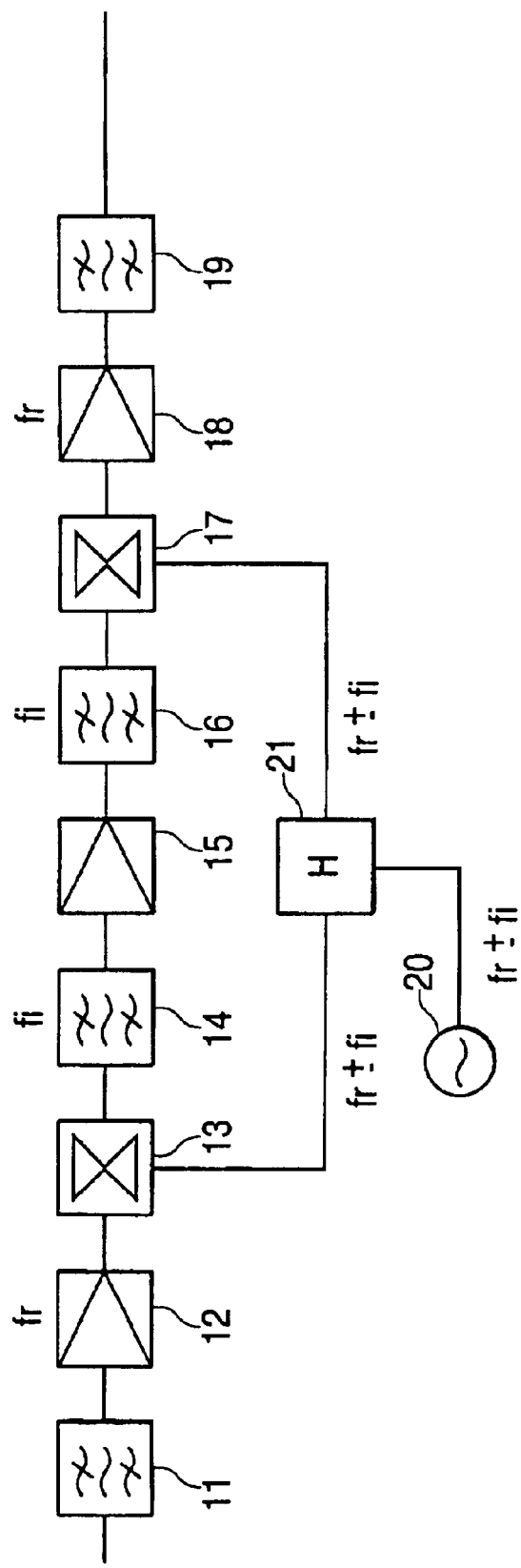
FIG. 4 is a construction view illustrating an example of a conventional high-frequency amplifier apparatus.
Figure 5:
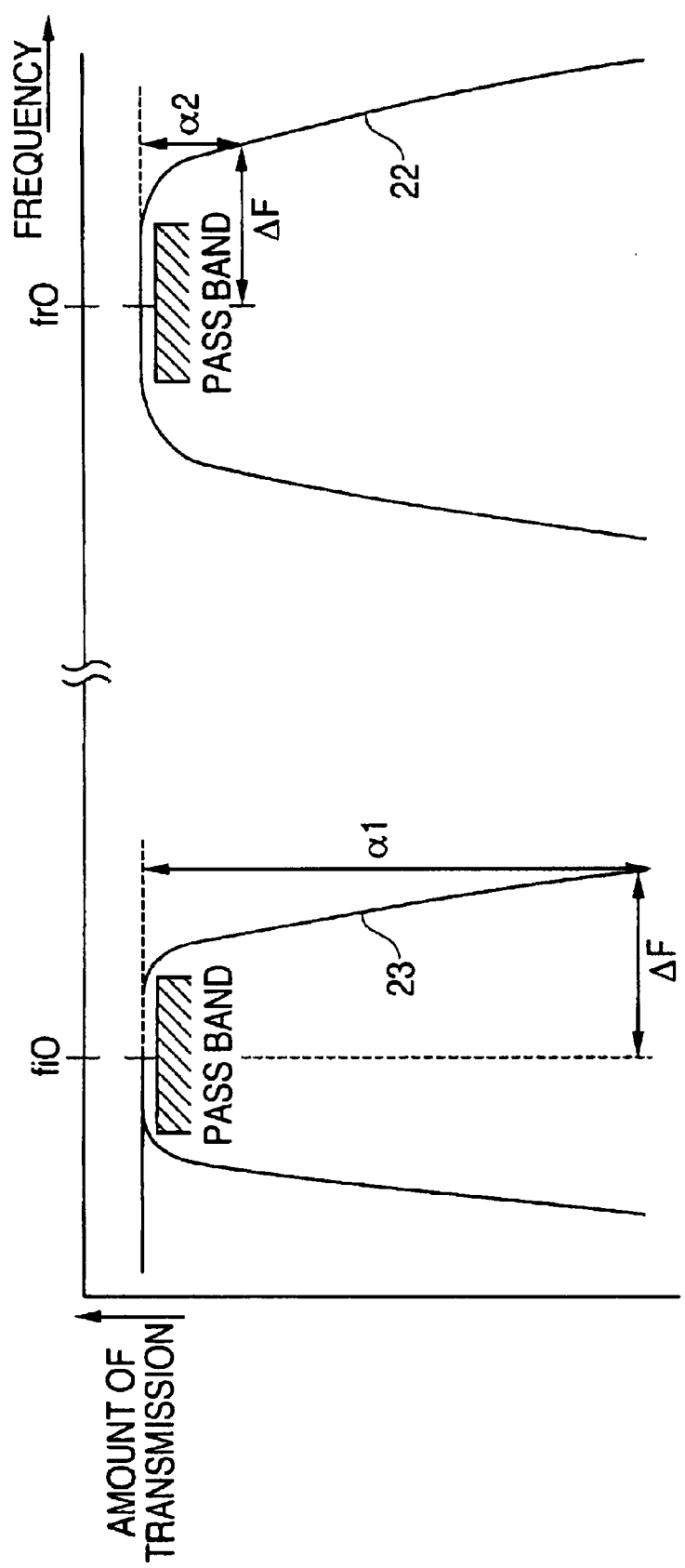
FIG. 5 is a graph illustrating the transmission characteristics of a band pass filter that occur when the center frequency has been changed.

It is to be noted that the same portions as those in the conventional high-frequency amplifier apparatus illustrated in FIG. 4 are denoted by like reference numerals and a duplicated explanation thereof is omitted.

Figure 1:
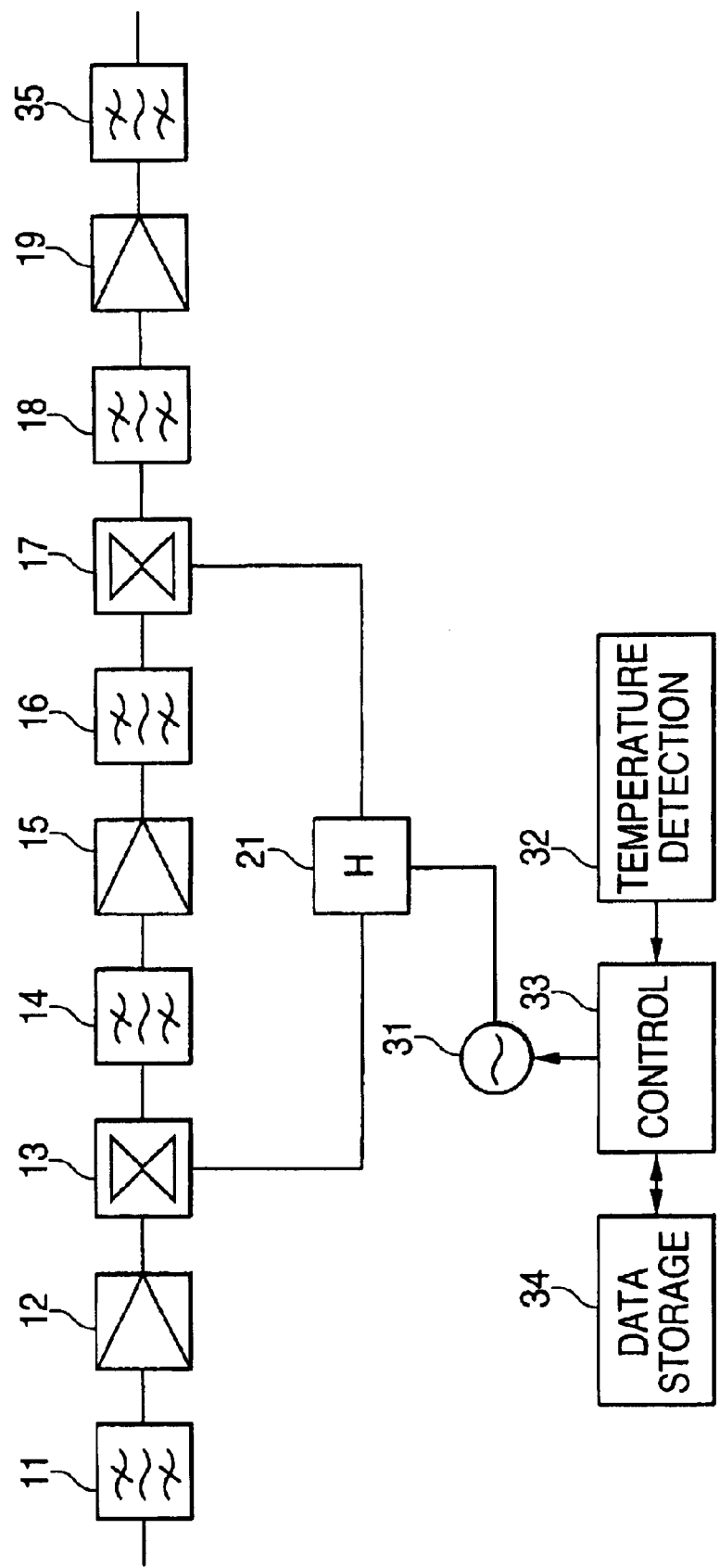
FIG. 1 is a construction view illustrating a high-frequency amplifier apparatus according to an embodiment of the present invention.
Figure 2:
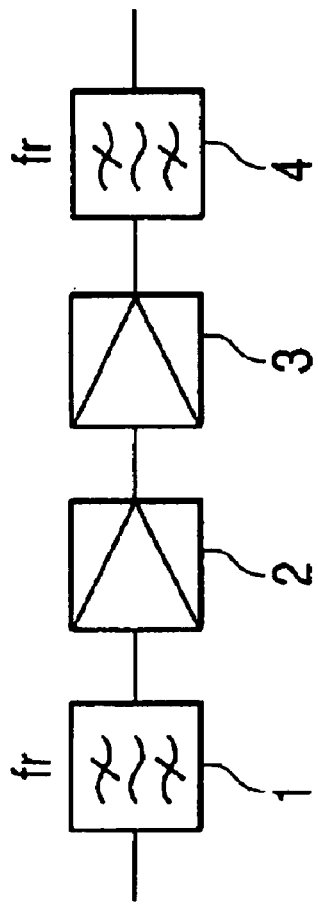
FIG. 2 is a construction view illustrating an example of a conventional amplifier apparatus.
Figure 3:
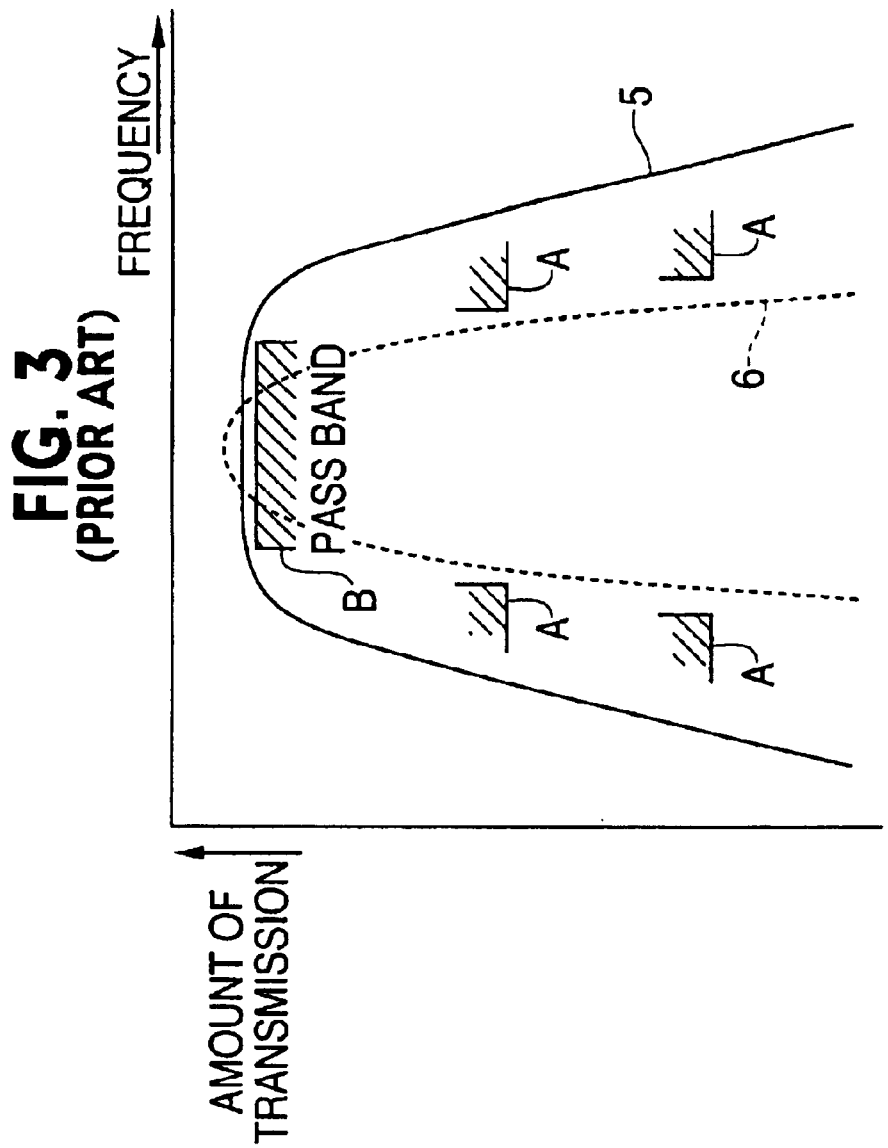
FIG. 3 is a graph illustrating an example of the transmission characteristic of a band pass filter.

In FIG. 1 there is illustrated the construction of a high-frequency amplifier apparatus according to this embodiment. Compared to the high-frequency amplifier apparatus illustrated in FIG. 4, the high-frequency amplifier apparatus of this embodiment differs from that apparatus in the following respects. Namely, this embodiment includes a local oscillator 31 that is constructed of a voltage-controlled oscillator (VCO), etc. and that can be altered in terms of the oscillation frequency supplied to each of the frequency converters 13, 17, a temperature detector 32 for detecting the ambient temperature of each of the band pass filters 14, 16, a controller 33 for controlling the local oscillator 31 so as to oscillate an appropriate local oscillation frequency under the condition that the temperature is at a detected value, and a memory 34 having previously stored therein the center frequency shift data of the transmission characteristic due to a change in the temperature of each of the band pass filters 14, 16.

The high-frequency amplifier apparatus of this embodiment has the above-described construction. As a result of this, the shift of the center frequency in each band pass filter due to a change in the ambient temperature is corrected as described below to thereby realize the originally aimed amplification characteristic (transmission characteristic).

Incidentally, in this embodiment, to an output end of a power amplifier 19 there is provided a band pass filter 35 for further limiting the signal to a required frequency band.

Next, an explanation will be given of how to correct the shift of the center frequency in the band pass filter 14, 16 concretely.

First, assume that the local oscillation frequency of the local oscillator 31 be constant regardless of the change in the ambient temperature. Then, the transmission characteristic of each pass band filter 14, 16 becomes the one wherein the center frequency becomes inconveniently shifted correspondingly to a change in the ambient temperature as in the case illustrated in FIG. 6. Following this, the transmission characteristic of the high-frequency amplifier apparatus inconveniently becomes the temperature-dependency characteristic corresponding to the change in the temperature in each filter, too.

Here, as illustrated in FIG. 6, when a change has occurred from the originally aimed characteristic 24 to an improper characteristic 25, this means that the center frequency of the filter was changed by that time from f1 to f2. Namely, it means that the center frequency was shifted by the difference $|f2-f1|=\Delta f$.

Therefore, in this embodiment, the controller 33 sets the local oscillation frequency of the local oscillator 31 to a frequency $fr\pm(fi+\Delta f)$ obtained by changing this local oscillation frequency correspondingly to the amount of shift due to the change in the temperature. It then supplies that frequency to each of the frequency converters 13 and 17. It is to be noted that the fr represents the frequency of the original band while the fi represents the frequency of the IF band.

Namely, by performing such correction control of shifting the local oscillation frequency, the frequency that has been converted in the frequency converter 13 becomes $fi+\Delta f$. This leads to exactly canceling the amount of shift of the center frequency due to a change in the temperature in each band pass filter 14, 16. Therefore, the shift in each filter resulting from the change in the temperature such as that illustrated in FIG. 6 is corrected. Therefore, this brings about the same results as those that are obtained when filtering is done with the originally available unchanged center frequency.

Incidentally, the signal is converted to the original band through the use of the frequency converter 17. But, since the local oscillation frequency at this time is $fr\pm(fi+\Delta f)$, that signal is transmitted by having its frequency reconverted to the original frequency fr.

In this way, in the temperature detector 32, the condition of the ambient temperature of each band pass filter 14, 16 is instantaneously detected. This detected temperature is sent out to the controller 33, where there is determined from the data stored in the memory 34 and the detected condition of the temperature. The controller 33 thereby controls to cause the local oscillator 31 to send out an appropriate frequency.

As a result of this, the local oscillation frequency becomes one conforming to the ambient condition of temperature. Consequently, there is realized a high-frequency amplifier apparatus in which there has been corrected the shift of the transmission frequency characteristic in each band pass filter due to a change in the temperature.

As has been explained above in detail, according to the present invention, it is possible to realize a high-frequency amplifier apparatus which can only select and amplify a frequency of a peculiar-to-apparatus band, which sharply attenuates the frequency of an adjoining other-system band, which can stably operate even against a rapid change in the ambient temperature, and which is small in size and low in cost.

In addition, the amplifier apparatus of the present invention contains a memory for storing therein the shift data with respect to the temperature. Therefore, by changing the stored data, the amplifier apparatus of it becomes able to cope with another replaced filter the temperature characteristic of that is different. Therefore, when performing common designing, the present invention has a very great practical effect.

What is claimed is:

1. An amplifier apparatus, the amplifier apparatus being adapted to convert a signal to be processed into one having an intermediate frequency band to thereby execute amplification processing, comprising:
   a local oscillator the oscillation frequency of that can be altered;
   a first frequency converter that converts the signal to be processed by the use of the oscillation frequency from the local oscillator into an intermediate frequency;
   a first intermediate frequency band/band pass filter that limits to an intermediate frequency band the signal to be processed having the intermediate frequency that has been output from the first frequency converter;
   an intermediate-frequency amplifier that amplifies the signal to be processed having the intermediate frequency that has passed through the first intermediate frequency band/band pass filter;
   a second intermediate frequency band/band pass filter that limits to an intermediate frequency band the signal to be processed having the intermediate frequency that has been output from the intermediate-frequency amplifier;
   a second frequency converter that converts the signal to be processed having the intermediate frequency that has passed through the second intermediate frequency band/band pass filter into the original frequency by the use of the oscillation frequency from the local oscillator;
   a temperature sensor that detects the temperature of each of the first and second intermediate frequency band/band pass filters; and
   a controller that alters the oscillation frequency of the local oscillator in correspondence with the detected temperature and thereby stabilizes the transmission characteristic of each of the first and second intermediate frequency band/band pass filters irrespective of the change in the temperature.

2. An amplifier apparatus according to claim 1, further comprising:
   a memory having stored therein frequency shift data of the transmission characteristics of the first and second intermediate frequency band/band pass filters that varies correspondingly to the change in the temperature, whereby the controller alters the oscillation frequency of the local oscillator according to the frequency shift data read out from the memory and the detected temperature from the temperature detector.

3. An amplifier apparatus, the amplifier apparatus being adapted to convert a signal to be processed into one having an intermediate frequency band to thereby execute amplification processing, comprising:

a local oscillator the oscillation frequency of that can be altered;

a first frequency converter that converts the signal to be processed by the use of the oscillation frequency from the local oscillator into an intermediate frequency;

a first intermediate frequency band/band pass filter that limits to an intermediate frequency band the signal to be processed having the intermediate frequency that has been output from the first frequency converter;

an intermediate-frequency amplifier that amplifies the signal to be processed having the intermediate frequency that has passed through the first intermediate frequency band/band pass filter;

a second intermediate frequency band/band pass filter that limits to an intermediate frequency band the signal to be processed having the intermediate frequency that has been output from the intermediate-frequency amplifier;

a second frequency converter that converts the signal to be processed having the intermediate frequency that has passed through the second intermediate frequency band/band pass filter into the original frequency by the use of the oscillation frequency from the local oscillator;

a temperature sensor that detects the temperature of each of the first and second intermediate frequency band/band pass filters; and a controller that alters the oscillation frequency of the local oscillator in correspondence with the detected temperature and thereby cancels the shift of a center frequency due to the variation in the temperature of each of the first and second intermediate frequency band/band pass filters.

4. An amplification method, the amplification method comprising:

converting a signal to be processed to an intermediate frequency by the use of an oscillation frequency from a local oscillator and thereafter limiting the signal to be processed having the intermediate frequency to an intermediate frequency band by the use of a first intermediate frequency band/band pass filter;

amplifying the signal to be processed having the intermediate frequency that has passed through the first intermediate frequency band/band pass filter and thereafter limiting the signal to be processed having the amplified intermediate frequency to an intermediate frequency band by the use of a second intermediate frequency band/band pass filter; and converting the signal to be processed having the intermediate frequency that has passed through the second intermediate frequency band/band pass filter to its original frequency signal by the use of the oscillation frequency from the local oscillator, the amplification method comprising the steps of:

detecting the temperature of each of the first and second intermediate band/band pass filter, altering the oscillation frequency of the local oscillator correspondingly to the detected temperature, and thereby canceling the shift of the center frequency due to the change in the temperature of each of the first and second intermediate frequency band/band pass filters.

* * * * *